United States Patent Office 3,050,528
Patented Aug. 21, 1962

3,050,528
REACTION PRODUCT OF OLEIC ACID, SEBACIC ACID, AND TRIETHYLENE TETRAMINE
Elizabeth C. Dearborn, Boston, and Philip K. Isaacs, Brookline, Mass., assignors to W. R. Grace & Co., Cambridge, Mass., a corporation of Connecticut
No Drawing. Filed Dec. 28, 1960, Ser. No. 78,878
3 Claims. (Cl. 260—309.6)

This invention relates to compositions containing a complex compound having a plurality of imidazoline rings as a principal constituent. In another aspect it relates to a method for preparing such compositions by contacting a plurality of diverse carboxylic acids and a polyethylene polyamine under reactive conditions.

Monoimidazolines, such as undecylimidazoline, and diimidazolines, such as octamethylene diimidazoline, are known but have limited utility. The complex polyimidazoline of this invention has a high molecular weight, is strongly basic, and possesses strong surface activity. When incorporated with a polymeric material, such as polymers and copolymers of vinyl chloride, it performs admirably as a curing agent.

The present compositions are prepared by heating oleic and sebacic acids and triethylene tetramine at reduced pressures under nitrogen while vigorously agitating the reactants. Imidazoline formation proceeds essentially in two steps. In the first step, a terminal amino group of the polyamine reacts with a carboxyl group to form an amide with the release of one mole of water. Then, a second mole of water splits out from the amide group and a secondary amino group beta to it, causing cyclization to give an imidazoline. Dicarboxylic acids reacting with polyamines in this manner produce a complex polyimidazoline containing imidazoline rings plus some amide groups and secondary amino groups resulting from incomplete cyclization. The reaction yields a mixture comprising a major amount of (1) a polyimidazoline having the following idealized structure:

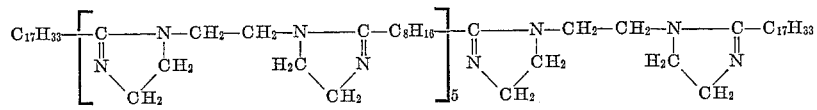

in which up to about 20 percent of the original carboxyl groups are in the form of unconverted amides

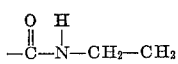

derived from the reaction of acid with primary amine groups, and/or N-substituted amides

derived from either hydrolysis of previously formed imidazoline rings or the reaction of acid with secondary amine groups, and/or (2) species of imidazolines and polyimidazolines having higher and lower molecular weights than the molecular weight of the idealized polyimidazoline structure.

In carrying out the invention, the oleic acid is first charged to a mixing vessel and then the sebacic acid is stirred in. Agitation is continued throughout the reaction period. The acid mixture is deoxygenated at a pressure of about 15 mm. Hg, the vacuum is released with nitrogen and a blanketing stream of nitrogen is thereafter used throughout the reaction. Following deoxygenation, the acids are heated to about 70° C., the requisite amount of triethylene tetramine is added and the temperature rises to about 100° C., due to salt formation. Immediately after adding all of the triethylene tetramine, the system is protected during synthesis against catalytic pro-oxidant metals by the addition of a chelating and inactivating agent. These metals, which are introduced as impurities in the acid and amine reactants, catalyze degradation of the reaction product with a resulting increase in viscosity and darkening of the product. Even small leaks in the packing surrounding the agitator shaft through which atmospheric oxygen can gain entrance into the mixing vessel can cause a tenfold increase in the viscosity. The agent is added in amounts sufficient to react with substantially all of the metallic impurities present in the reactants and generally between about 0.1 percent to 0.5 percent by weight based on the total weight of the acids and amine has been found satisfactory. Suitable agents include the alkali metal polyphosphates, such as sodium and potassium tripolyphosphate.

The mixture is then heated at 1 atmosphere to about 150° C. at which point the pressure and temperature are adjusted periodically in inverse relationship according to the following schedule:

| Heating period in minutes after reaction mixture has reached 150° C. at 1 atm. | Temperature, ° C. | Pressure, mm. Hg |
|---|---|---|
| 20 | 152.5 | 585 |
| 40 | 152.5 | 435 |
| 60 | 155 | 335 |
| 80 | 165 | 235 |
| 100 | 182.5 | 135 |
| 120 | 192.5 | 110 |
| 140 | 202.5 | 85 |
| 160 | 212.5 | 35 |
| 180 | 220 | 15 |

Since water catalyzes side reactions and hydrolyzes imidazolines, it is removed as it is formed in order to achieve maximum conversion to imidazoline. The above schedule permits removal of water as fast as possible consistent with imidazoline conversion without distilling appreciable amounts of tetramine. During the reaction period, the agitator should be run at a high rate of speed to give a high surface turnover of the mixture for rapid water removal. An agitator speed of about 100–200 r.p.m. has been found to be satisfactory. Experiments have shown that low water removal caused by decreasing the speed from about 150 to 65 r.p.m. lowered the imidazoline content by about 10 percent due to irreversible hydrolysis of the imidazoline ring.

After a temperature of about 220° C. and a pressure of about 15 mm. Hg have been reached within three hours according to the foregoing schedule, the pressure and temperature are held at these values and the reaction is continued for about one hour. Thereafter the product is cooled to 150° C. under nitrogen and collected. The viscosity of the reaction product averaged about 100,000 centipoises at 60° C. The average composition as determined by infrared absorption analysis is comprised of structures resulting from about 80 percent conversion of the carboxyl groups to imidazoline rings with the remaining 20 percent of the carboxyl groups existing as amide groups. The average molecular weight of the reaction product ranges between about 3,000 to 4,500 as against about 2,000 based on the idealized polyimidazoline structure.

The molar quantities of acids and amine used to prepare the reaction mixture are 2 moles of oleic acid, 5 moles of sebacic acid and 6 moles of triethylene tetramine.

The invention is further illustrated by the following examples:

Example 1

49.0 lbs. (.17 mole) of oleic acid were charged to a glass vacuum vessel and then 87.6 lbs. (.43 mole) of sebacic acid were added thereto. The acids were heated to about 70° C. and then 76 lbs. (.52 mole) of triethylene tetramine were added. Due to the exothermic nature of the reaction between the amine and acids, the temperature of the mixture rose to about 100° C. 0.213 lb. of powdered sodium tripolyphosphate was then added as a metal chelating agent. Vigorous agitation and a nitrogen atmosphere were maintained throughout. The mixture was then heated at 1 atmosphere to about 150° C. and the temperature and pressure were carefully controlled thereafter for a four-hour period according to the pressure-temperature schedule set forth hereinbefore. During this period, water of condensation was continuously removed to avoid hydrolysis of the imidazolines. The amount of water removed over the entire reaction period corresponded with about 80 percent conversion of the carboxyl groups to imidazoline groups, leaving a balance of about 20 percent of the carboxyl groups in the form of amides. The composition of the reaction mixture was confirmed by infrared absorption analysis. Finally, the product was cooled under nitrogen to about 130° C.

The utility of the reaction product is demonstrated in the following Example 2 in which all parts are reported on a weight basis:

Example 2

Two parts of a reaction product prepared according to the procedure of Example 1 were added to 90 parts of paste grade polyvinyl chloride, 5 parts of epoxidized soybean oil, 18 parts of calcium carbonate, and 5 parts of zinc oxide. This formulation was thoroughly milled at 149° C. until smooth, then sheeted out and press-molded into test specimens. The specimens were cured in 15 minutes at 193° C. giving a thermoset polymer. Properties of the cured polymer were as follows:

| | |
|---|---|
| Tensile strength at room temp., p.s.i | 7200 |
| Tensile strength at 93° C., p.s.i | 3500 |
| Percent creep at 121° C./60 p.s.i. load | 10 |

These results indicate that the curing action of the reaction product of this invention definitely improves temperature resistance of rigid polyvinyl chloride products. The thermosetting character of this polymer renders it useful in such applications where resistance to deformation at elevated temperatures is a prime criterion.

Five 200-lb. batches of the triethylene tetramine-acids reaction product were prepared according to the procedure described in Example 1. The compositions of the resulting products as determined by infrared analysis were comprised of structures with 79–82 percent (average 80 percent) conversion of the carboxyl groups to imidazoline rings and the remaining 18–21 percent of the original carboxyl groups existing as amide groups.

We claim:

1. A composition derived by reacting in a deoxygenated system 2 moles of oleic acid, 5 moles of sebacic acid, and 6 moles of triethylene tetramine at a temperature of about 50° C. to 240° C. and a pressure of about 10 to 760 mm. Hg while continuously removing the water of reaction, and continuing the reaction until the flow of water of reaction substantially ceases.

2. A composition according to claim 1 wherein the reaction is carried out in the presence of a small amount of a chelating agent.

3. A composition according to claim 2 wherein the chelating agent is sodium tripolyphosphate.

References Cited in the file of this patent

UNITED STATES PATENTS

| | | |
|---|---|---|
| 2,374,354 | Kaplan | Apr. 24, 1945 |
| 2,568,876 | White et al. | Sept. 25, 1951 |
| 2,668,165 | Carpenter | Feb. 2, 1954 |
| 2,846,440 | Hughes | Aug. 5, 1958 |
| 2,916,376 | Stromberg et al. | Dec. 15, 1959 |